United States Patent
Shimada et al.

(10) Patent No.: US 9,957,189 B2
(45) Date of Patent: May 1, 2018

(54) HEAT-ABSORBING GLASS PLATE AND METHOD FOR MANUFACTURING SAME

(71) Applicant: Asahi Glass Company, Limited, Chiyoda-ku (JP)

(72) Inventors: Yuya Shimada, Chiyoda-ku (JP); Yusuke Arai, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days. days.

(21) Appl. No.: 15/290,312

(22) Filed: Oct. 11, 2016

(65) Prior Publication Data

US 2017/0029315 A1 Feb. 2, 2017

Related U.S. Application Data

(63) Continuation of application No. PCT/JP2015/063369, filed on May 8, 2015.

(30) Foreign Application Priority Data

May 9, 2014 (JP) ................................. 2014-098129

(51) Int. Cl.
C03C 3/087 (2006.01)
C03C 4/08 (2006.01)
C03C 3/095 (2006.01)

(52) U.S. Cl.
CPC .............. C03C 3/087 (2013.01); C03C 3/095 (2013.01); C03C 4/08 (2013.01); C03C 4/082 (2013.01)

(58) Field of Classification Search
CPC .. C03C 3/087; C03C 4/02; C03C 4/08; C03C 4/082; C03C 4/085
See application file for complete search history.

(56) References Cited

U.S. PATENT DOCUMENTS

| | | | | |
|---|---|---|---|---|
| 3,723,142 A * | 3/1973 | Kato | ......................... | C03C 1/10 501/71 |
| 5,393,593 A * | 2/1995 | Gulotta | ..................... | C03C 1/10 428/212 |
| 6,313,053 B1 * | 11/2001 | Shelestak | ................ | C03C 3/087 501/71 |
| 8,518,843 B2 * | 8/2013 | Shimada | ................. | C03C 3/087 501/70 |
| 8,962,503 B2 * | 2/2015 | Nagai | ..................... | C03C 3/087 501/70 |
| 9,193,621 B2 * | 11/2015 | Shimada | ................. | C03C 3/087 |
| 2002/0155939 A1 | 10/2002 | Seto et al. | | |
| 2003/0216242 A1 * | 11/2003 | Arbab | ..................... | C03C 3/087 501/71 |
| 2004/0102304 A1 | 5/2004 | Boulos et al. | | |
| 2005/0170944 A1 * | 8/2005 | Arbab | ..................... | C03C 3/087 501/64 |
| 2009/0325776 A1 | 12/2009 | Murata | | |
| 2012/0289394 A1 * | 11/2012 | Nagai | ....................... | C03C 4/02 501/66 |

FOREIGN PATENT DOCUMENTS

| | | |
|---|---|---|
| JP | 3-5342 | 1/1991 |
| JP | 4-275943 | 10/1992 |
| JP | 10-114540 | 5/1998 |
| JP | 3112385 | 11/2000 |
| JP | 2006-518324 | 8/2006 |
| JP | 4953504 | 6/2012 |

OTHER PUBLICATIONS

International Search Report dated Jul. 21, 2015 in PCT/JP2015/063369 filed on May 8, 2015.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

A heat-absorbing glass plate containing iron, tin, selenium, cobalt and sulfur, where the mass ratio of divalent iron as calculated as $Fe_2O_3$ to total iron as calculated as $Fe_2O_3$ is at least 55%, the ratio Tv/Te of the visible light transmittance Tv (by illuminant A, 2° visual field) as defined in JIS R3106 (1998) calculated as 4 mm thickness of the glass plate to the solar transmittance Te as defined in JIS R3106 (1998) calculated as 4 mm thickness of the glass plate, is at least 1.5, the visible light transmittance Tv (by illuminant A, 2° visual field) is at most 65% as defined in JIS R3106 (1998) calculated as 4 mm thickness of the glass plate, and the excitation purity Pe is at most 7% as defined in JIS Z8701 (1999) calculated as 4 mm thickness of the glass plate.

14 Claims, No Drawings

HEAT-ABSORBING GLASS PLATE AND METHOD FOR MANUFACTURING SAME

TECHNICAL FIELD

The present invention relates to a heat-absorbing glass plate and a process for its production.

BACKGROUND ART

A heat-absorbing glass plate is required to have a solar transmittance sufficiently lower than the visible light transmittance. That is, it is required to have a high ratio Tv/Te of the visible light transmittance (by illuminant A, 2° visual field) as defined in JIS R3106 (1998) (hereinafter sometimes referred to as Tv) calculated as 4 mm thickness of the glass plate to the solar transmittance as defined in JIS R3106 (1998) (hereinafter sometimes referred to as Te) calculated as 4 mm thickness of the glass plate.

Further, the heat-absorbing glass plate may sometimes be required to have low Tv in order that the interior is hardly seen through the glass plate from the outside to secure privacy.

Further, the heat-absorbing glass plate is required to provide a substantially achromatic (gray) transmitted light, that is, to have a low excitation purity Pe as defined in JIS Z8701 (1999) (hereinafter sometimes referred to as Pe), in order that an object or a scene can be seen in the actual colors when observed through the glass plate.

As a heat-absorbing glass plate having a low Pe, for example, the following glass plate has been proposed.

(1) A heat-absorbing glass plate (Patent Document 1) containing, as represented by mass % based on the following components:
$SiO_2$: 66 to 75%,
$Na_2O$: 10 to 20%,
CaO: 5 to 15%,
MgO: 0 to 5%,
$Al_2O_3$: 0 to 5%,
$K_2O$: 0 to 5%,
total iron as calculated as $Fe_2O_3$: 0.30 to 0.70%,
divalent iron as calculated as FeO: at most 0.21%,
CoO: 3 to 35 ppm, and
Se: 1 to 15 ppm,
wherein the luminous transmittance is at least 60% in 3.9 mm thickness, the dominant wavelength is from 480 to 559 nm, and the excitation purity is at most 8% in 3.9 mm thickness.

(2) A heat-absorbing glass plate (Patent Document 1) containing, as represented by mass % based on the following components:
$SiO_2$: 66 to 75%,
$Na_2O$: 10 to 20%,
CaO: 5 to 15%,
MgO: 0 to 5%,
$Al_2O_3$: 0 to 5%,
$K_2O$: 0 to 5%,
total iron as calculated as $Fe_2O_3$: 0.17 to 0.65%,
divalent iron as calculated as FeO: at most 0.18%,
CoO: 15 to 55 ppm,
Se: 0 to 5 ppm, and
NiO: 50 to 350 ppm,
wherein the luminous transmittance is at least 60% in 3.9 mm thickness, the dominant wavelength is from 480 to 580 nm, and the excitation purity is at most 8% in 3.9 mm thickness.

(3) A heat-absorbing glass plate (Patent Document 2) containing, as represented by mass % based on oxides:
$SiO_2$: 66 to 75%,
$Na_2O$: 10 to 20%,
CaO: 5 to 15%,
MgO: 0 to 5%,
$Al_2O_3$: 0 to 5%,
$K_2O$: 0 to 5%,
total iron as calculated as $Fe_2O_3$: 0.40 to 1.0%,
CoO: 4 to 20 ppm, and
$Cr_2O_3$: 0 tO 100 ppm,
wherein the mass ratio (FeO/t-$Fe_2O_3$) of divalent iron as calculated as FeO to total iron as calculated as $Fe_2O_3$ is from 0.35 to 0.50, the luminous transmittance is at least 65% in 3.9 mm thickness, the dominant wavelength is from 485 to 489 nm, the excitation purity is from 3 to 18%, the total solar energy transmittance is at most 55% in 3.9 mm thickness, the total solar ultraviolet transmittance is at most 60% in 3.9 mm thickness, and the total solar infrared transmittance is at most 35% in 3.9 mm thickness.

(4) A heat-absorbing glass plate (Patent Document 3) containing, as represented by mass % based on the following components:
$SiO_2$: 65 to 75%,
$Na_2O$: 10 to 20%,
CaO: 5 to 15%,
MgO: 0 to 5%,
$Al_2O_3$: 0 to 5%,
$K_2O$: 0 to 5%,
total iron as calculated as $Fe_2O_3$: 0.30 to 0.75%,
CoO: 0 to 15 ppm, and
Se: 1 to 15 ppm,
wherein the mass ratio (FeO/t-$Fe_2O_3$) of divalent iron as calculated as FeO to total iron as calculated as $Fe_2O_3$ is from 0.26 to 0.675, the luminous transmittance is at least 65% in 3.9 mm thickness, the total solar energy transmission (TSET) is at most 65%, the standard transmitted color shift is less than 6, and the excitation purity is less than 8%.

PRIOR ART DOCUMENTS

Patent Documents

Patent Document 1: Japanese Patent No. 3112385
Patent Document 2: Japanese Patent No. 4953504
Patent Document 3: JP-A-2006-518324

DISCLOSURE OF INVENTION

Technical Problem

The heat-absorbing glass plate (1) has low Pe since it contains Se and CoO as gray coloring components. However, if the Se and CoO contents are low, Tv tends to be high. Further, the content of FeO i.e. divalent iron having an absorption peak at a wavelength in the vicinity of 1,100 nm is kept low, it is required to considerably increase the content of total iron as calculated as $Fe_2O_3$ (hereinafter sometimes referred to as t-$Fe_2O_3$) in order to keep Te low. However, the content of trivalent iron having an absorption peak at a wavelength in the vicinity of 400 nm also increases and resultingly, Tv is lowered more than necessary rather than Te and Tv/Te is lowered.

The heat-absorbing glass plate (2) has a low FeO content. Further, if Se as a gray coloring component is not contained, it is necessary to incorporate NiO so as to keep Pe low. Accordingly, Tv is lowered and as a result, Tv/Te is extremely low.

The heat-absorbing glass plate (3) has a high t-$Fe_2O_3$ content and accordingly has a high content of divalent iron having an absorption peak at a wavelength in the vicinity of 1,100 nm, and has a relatively high Tv/Te. However, since it contains no Se as a gray coloring component and has a high content of t-$Fe_2O_3$ as a blue or green coloring component, it has high Pe. Further, the luminous transmittance is set to be at least 65% in 3.9 mm thickness, and Tv is high.

Since the heat-absorbing glass plate (4) contains Se as a gray coloring component, it has low Pe. However, if the Se and CoO contents are low, Tv tends to be high. In order that the heat-absorbing glass plate (4) has high Tv/Te, it is considered to increase FeO/$Fe_2O_3$, that is, to increase the proportion of divalent iron having an absorption peak at a wavelength in the vicinity of 1,100 nm and to reduce the proportion of trivalent iron having an absorption peak at a wavelength in the vicinity of 400 nm. However, Tv/Te cannot be increased even if FeO/$Fe_2O_3$ is increased, from the following reasons.

A heat-absorbing glass plate usually contains sulfur derived from salt cake ($Na_2SO_4$) contained as a refining agent in a glass raw material. Sulfur is present as negative divalent or hexavalent sulfur in the glass, and negative divalent sulfur is amber-colored having an absorption peak at a wavelength in the vicinity of 380 nm, and hexavalent sulfur is colorless. By the way, in order to increase FeO/$Fe_2O_3$, it is required to add a reducing agent (such as coke) in a large amount to the glass raw material. However, when trivalent iron is reduced to divalent iron by the reducing agent, hexavalent sulfur is also reduced to negative divalent sulfur by the reducing agent, and amber coloring tends to be remarkable. Accordingly, even if FeO/$Fe_2O_3$ is increased in order to increase Tv/Te, Tv is decreased more than necessary by amber coloring and resultingly, Tv/Te is kept low.

The present invention provides a heat-absorbing glass plate having a low visible light transmittance, a solar transmittance sufficiently lower than the high visible light transmittance, and a low excitation purity, and a process for producing it.

Solution to Problem

The heat-absorbing glass plate of the present invention is a heat-absorbing glass plate containing iron, tin, selenium, cobalt and sulfur, wherein the mass ratio of divalent iron as calculated as $Fe_2O_3$ to total iron as calculated as $Fe_2O_3$ is at least 55%, the ratio Tv/Te of the visible light transmittance Tv (by illuminant A, 2° visual field) as defined in JIS R3106 (1998) calculated as 4 mm thickness of the glass plate to the solar transmittance Te as defined in JIS R3106 (1998) calculated as 4 mm thickness of the glass plate, is at least 1.5, the visible light transmittance Tv (by illuminant A, 2° visual field) is at most 65% as defined in JIS R3106 (1998) calculated as 4 mm thickness of the glass plate, and the excitation purity Pe is at most 7% as defined in JIS Z8701 (1999) calculated as 4 mm thickness of the glass plate.

The heat-absorbing glass plate of the present invention may be such that the transmittance at a wavelength of 1,500 nm is at most 30% calculated as 4 mm thickness of the glass plate.

The heat-absorbing glass plate of the present invention may provide a transmitted light having a dominant wavelength Dw of at most 560 nm, preferably at most 510 nm, more preferably at most 503 nm, as defined in JIS Z8701 (1999) calculated as 4 mm thickness of the glass plate.

The heat-absorbing glass plate of the present invention may be such that the solar transmittance Te is at most 50% as defined in JIS R3106 (1998) calculated as 4 mm thickness of the glass plate.

The heat-absorbing glass plate of the present invention may be such that the mass ratio ($SnO_2/SO_3$) of the content of total tin as calculated as $SnO_2$ to the content of total sulfur as calculated as $SO_3$ is from 0.2 to 210, preferably from 0.2 to 150, more preferably from 0.2 to 110, further preferably from 0.2 to 100.

The heat-absorbing glass plate of the present invention may be such that the content of total sulfur as calculated as $SO_3$ as represented by mass % based on oxides is from 0.001 to 0.1%, preferably from 0.002 to 0.1%, more preferably from 0.005 to 0.1%.

The heat-absorbing glass plate of the present invention may be such that the content of total iron as calculated as $Fe_2O_3$ as represented by mass % based on oxides is from 0.01 to 1.0%.

The heat-absorbing glass plate of the present invention may be such that the MgO content as represented by mass % based on oxides is at most 3.0%.

The heat-absorbing glass plate of the present invention may be made of soda lime silica glass containing, as represented by mass % based on the following components:
$SiO_2$: 65 to 75%,
$Al_2O_3$: more than 3% and at most 6%,
MgO: at least 0% and less than 2%,
CaO: 7 to 10%,
$Na_2O$: 5 to 18%,
$K_2O$: 0 to 5%,
total iron as calculated as $Fe_2O_3$: 0.3 to 0.9%,
total tin as calculated as $SnO_2$: 0.02 to 0.3%
Se: 0.0003 to 0.0020%
CoO: 0.0010 to 0.0060%, preferably from 0.0020 to 0.0060%, and
total sulfur as calculated as $SO_3$: 0.001 to 0.1%, preferably from 0.002 to 0.1%, more preferably from 0.005 to 0.1%.

The heat-absorbing glass plate of the present invention may be such that the content of total sulfur as calculated as $SO_3$ as represented by mass % based on oxides is at least 0.005% and less than 0.02%.

The heat-absorbing glass plate of the present invention may be such that β-OH is at least 0.15 $mm^{-1}$.

The process for producing a heat-absorbing glass plate of the present invention is a process for producing a heat-absorbing glass plate, which comprises melting a glass raw material, followed by forming to produce soda lime silica glass, wherein the glass after the forming is the heat-absorbing glass plate of the present invention.

Advantageous Effects of Invention

The heat-absorbing glass plate of the present invention has a low visible light transmittance, a solar transmittance sufficiently lower than the high visible light transmittance, and a low excitation purity.

According to the process for producing a heat-absorbing glass plate of the present invention, it is possible to produce a heat-absorbing glass plate having a low visible light transmittance, a solar transmittance sufficiently lower than the visible light transmittance, and a low excitation purity.

DESCRIPTION OF EMBODIMENTS

The following definitions of terms are applicable throughout description and claims.

The expression "to" defining the above numerical range is used to include the numerical values before and after it as the lower limit value and the upper limit value.

The content of total iron is represented as an amount of $Fe_2O_3$ in accordance with a standard method of analysis, however, not the entire iron present in glass is present as trivalent iron, and divalent iron is also present.

The content of total tin is represented as an amount of $SnO_2$ in accordance with a standard method of analysis, however, not the entire tin present in glass is present as tetravalent tin, and divalent tin is also present.

The content of total sulfur is represented as an amount of $SO_3$ in accordance with a standard method of analysis, however, not the entire sulfur present in glass is present as hexavalent sulfur, and negative divalent sulfur is also present.

The visible light transmittance Tv is the visible light transmittance calculated by measuring the transmittance by a spectrophotometer in accordance with JIS R3106 (1998). The coefficient is a value of the 2 degree field of view with illuminant A.

The solar transmittance Te is the solar transmittance calculated by measuring the transmittance by a spectrophotometer in accordance with JIS R3106 (1998).

The excitation purity Pe is the excitation purity calculated in accordance with JIS Z8701 (1999).

The dominant wavelength Dw of the transmitted light is the excitation purity calculated in accordance with JIS Z8701 (1999).

Now, en embodiment of the present invention will be described.

The heat-absorbing glass plate according to an embodiment of the present invention contains iron, tin, selenium, cobalt and sulfur, and is characterized in that the mass ratio of divalent iron as calculated as $Fe_2O_3$ to total iron as calculated as $Fe_2O_3$ (hereinafter referred to as Fe-redox) is at least 55%, the ratio Tvire of Tv calculated as 4 mm thickness of the glass plate to Te calculated as 4 mm thickness of the glass plate, is at least 1.5, Tv is at most 65% calculated as 4 mm thickness of the glass plate, and Pe is at most 7% calculated as 4 mm thickness of the glass plate.

The heat-absorbing glass plate according to the present embodiment contains iron. Iron is a component to lower Te and is a blue or green coloring component.

Usually, divalent iron and trivalent iron are present in glass. Divalent iron has an absorption peak at a wavelength in the vicinity of 1,100 nm, and trivalent iron has an absorption peak at a wavelength in the vicinity of 400 nm. Accordingly, when attention is focused on the infrared absorptivity, the amount of divalent iron ($Fe^{2+}$) is preferably larger than trivalent iron ($Fe^{3+}$). Accordingly, with a view to keeping Te low, it is preferred to increase Fe-redox.

In the heat-absorbing glass plate according to the present embodiment, Fe-redox is at least 55%. If Fe-redox is at least 55%, Te can be kept low. Fe-redox is preferably at least 57%, more preferably at least 59%. On the other hand, if Fe-redox is too high, the step of melting the glass raw material tends to be complicated. Fe-redox is preferably at most 80%, more preferably at most 70%, further preferably at most 65%.

In the heat-absorbing glass plate according to the present embodiment, the content of $t-Fe_2O_3$ as represented by mass % based on oxides is preferably from 0.01 to 1.0%. When $t-Fe_2O_3$ content is at least 0.01%, Te can be kept low. Along with an increase of the content of $t-Fe_2O_3$, Te decreases but Tv also decreases. When the content of $t-Fe_2O_3$ is at most 1.0%, a decrease of Tv can be suppressed. The content of $t-Fe_2O_3$ as represented by mass % based on oxides, is preferably at most 0.9%, preferably from 0.1 to 0.7%, more preferably from 0.2 to 0.5%, preferably at least 0.3%, more preferably from 0.3 to 0.45%, particularly preferably from 0.35 to 0.43%, most preferably from 0.38 to 0.42%.

The heat-absorbing glass plate according to the present embodiment contains tin. Tin functions as a buffering agent in oxidation-reduction reaction of iron and sulfur and suppresses amber coloring.

The content of total tin as calculated as $SnO_2$ is, as represented by mass % based on oxides, preferably from 0.02 to 0.3%. When the content of total tin as calculated as $SnO_2$ is at least 0.02%, amber coloring can be sufficiently suppressed. When the content of total tin as calculated as $SnO_2$ is at most 0.3%, volatilization of $SnO_2$ tends to be small, and the cost can be kept low. The content of total tin as calculated as $SnO_2$ is, as represented by mass % based on oxides, more preferably from 0.05 to 0.25%, further preferably from 0.09 to 0.23%, particularly preferably from 0.15 to 0.22%

The heat-absorbing glass plate according to the present embodiment contains selenium. Selenium is a gray coloring component, keeps Tv low, and keeps Pe low when used together with cobalt.

The content of Se as represented by mass % based on Se is preferably from 0.0003 to 0.0020% When the Se content is at least 0.0003%, Tv and Pe can be sufficiently kept low. When the Se content is at most 0.0020%, Tv can be increased. The Se content is, as represented by mass % based on Se, more preferably from 0.0006 to 0.0015%, further preferably from 0.0009 to 0.0013%, particularly preferably from 0.0010 to 0.0012%.

The heat-absorbing glass plate according to the present embodiment contains cobalt. Cobalt is a gray coloring component, keeps Tv low, and keeps Pe low when used together with selenium.

The content of total cobalt as calculated as CoO is, as represented by mass % based on oxides, preferably from 0.0010 to 0.0060%, more preferably from 0.0020 to 0.0060%. When the content of total cobalt as calculated as CoO is at least 0.0010%, further at least 0.0020%, Tv and Pe can be sufficiently kept low. When the content of total cobalt as calculated as CoO is at most 0.0060%, Tv can be increased. The content of total cobalt as calculated as CoO is, as represented by mass % based on oxides, more preferably from 0.0030 to 0.0050%, further preferably from 0.0035 to 0.0045%, particularly preferably from 0.0037 to 0.0041%.

The heat-absorbing glass plate according to the present embodiment contains sulfur. Sulfur derives from salt cake ($Na_2SO_4$) contained as a refining agent in the glass raw material.

The content of total sulfur as calculated as $SO_3$ is, as represented by mass % based on oxides, preferably from 0.001 to 0.1%, more preferably from 0.002 to 0.1%, further preferably from 0.005 to 0.1%. When the content of total sulfur as calculated as $SO_3$ is at least 0.001%, further at least 0.002%, further at least 0.005%, the refining effect at the time of melting glass tends to be good, and bubble remaining will not occur. When the content of total sulfur as calculated as $SO_3$ is at most 0.1%, a decrease of Tv by amber coloring can be suppressed. The content of total sulfur as calculated as $SO_3$ is, as represented by mass % based on oxides, more preferably at least 0.008%, further preferably at least 0.01%, particularly preferably at least 0.013%. The content of total sulfur as calculated as $SO_3$ is, as represented by mass % based on oxides, more preferably at most 0.05%, further preferably at most 0.03%, particularly preferably less than 0.02%, most preferably less than 0.016%.

Of the heat-absorbing glass plate according to the present embodiment, the mass ratio ($SnO_2/SO_3$) of the content of total tin as calculated as $SnO_2$ to the content of total sulfur as calculated as $SO_3$ is from 0.2 to 210, preferably from 0.2 to 150, more preferably from 0.2 to 110, further preferably from 0.2 to 100. When $SnO_2/SO_3$ is at least 0.2, amber coloring can be sufficiently suppressed. When $SnO_2/SO_3$ is at most 210, further at most 150, further at most 110, still further at most 100, volatilization tends to be small, and the cost can be kept low. $SnO_2/SO_3$ is more preferably from 1 to 50, further preferably from 3 to 30, particularly preferably from 5 to 20.

Of the heat-absorbing glass plate according to the present embodiment, the ratio of $SnO_2/SO_3$ to Fe-redox (($SnO_2/SO_3$)/Fe-redox) is preferably from 0.0025 to 5. When ($SnO_2/SO_3$)/Fe-redox is at least 0.0025, amber coloring can be sufficiently suppressed. When ($SnO_2/SO_3$)/Fe-redox is at most 5, volatilization tends to be small, and the cost can be kept low. ($SnO_2/SO_3$)/Fe-redox is more preferably from 0.05 to 3, further preferably from 0.08 to 2, particularly preferably from 0.15 to 1, most preferably from 0.2 to 0.5.

The heat-absorbing glass plate according to the present embodiment may contain MgO. MgO is a component to accelerate melting of the glass raw material and to improve the weather resistance.

The MgO content is, as represented by mass % based on oxides, preferably at most 3.0%. When the MgO content is at most 3.0%, devitrification hardly occurs. Further, a heat-absorbing glass plate having a MgO content of at most 3.0% has low Te as compared with a heat-absorbing glass plate having a MgO content of higher than 3.0% at the same Tv. Accordingly, when the MgO content is at most 3.0%, Te can be kept low while a decrease of Tv is suppressed. The MgO content is, as represented by mass % based on oxides, preferably at least 0% and less than 2.0%, more preferably from 0 to 1.0%, further preferably from 0 to 0.5%, particularly preferably from 0 to 0.2%, and it is most preferred that substantially no MgO is contained.

The heat-absorbing glass plate according to the present embodiment is preferably made of soda lime silica glass having substantially the following composition as represented by mass % based on the following components.

$SiO_2$: 65 to 75%,
$Al_2O_3$: more than 3% and at most 6%,
MgO: at least 0% and less than 2%,
CaO: 7 to 10%,
$Na_2O$: 5 to 18%,
$K_2O$: 0 to 5%,
total iron as calculated as $Fe_2O_3$: 0.3 to 0.9%,
total tin as calculated as $SnO_2$: 0.02 to 0.3%
Se: 0.0003 to 0.0020%
CoO: 0.0010 to 0.0060%, preferably from 0.0020 to 0.0060%, and
total sulfur as calculated as $SO_3$: 0.001 to 0.1%, preferably from 0.002 to 0.1%, more preferably from 0.005 to 0.1%.

When the $SiO_2$ content is at least 65%, the weather resistance will be good. When the $SiO_2$ content is at most 75%, devitrification hardly occurs. The $SiO_2$ content is, as represented by mass % based on oxides, preferably from 67 to 73%, more preferably from 68 to 71%.

$Al_2O_3$ is a component to improve the weather resistance. When the $Al_2O_3$ content is more than 3%, the weather resistance will be good. When the $Al_2O_3$ content is at most 6%, the melting property will be good. The $Al_2O_3$ content is, as represented by mass % based on oxides, preferably from 3.1 to 5%, more preferably from 3.2 to 4%.

CaO is a component to accelerate melting of the glass raw material and to improve the weather resistance.

When the CaO content is at least 7%, the melting property and weather resistance will be good. When the CaO content is at most 10%, devitrification hardly occurs. The CaO content is, as represented by mass % based on oxides, preferably from 7.5 to 9.5%, more preferably from 8 to 9%.

$Na_2O$ is a component to accelerate melting of the glass raw material.

When the $Na_2O$ content is at least 5%, the melting property will be good. When the $Na_2O$ content is at most 18%, the weather resistance will be good. The $Na_2O$ content is, as represented by mass % based on oxides, preferably from 10 to 17%, more preferably from 12 to 16%, further preferably from 14 to 15%.

$K_2O$ is a component to accelerate melting of the glass raw material.

When the $K_2O$ content is at most 5%, the weather resistance will be good. The $K_2O$ content is, as represented by mass % based on oxides, preferably from 0.5 to 3%, more preferably from 1 to 2%, further preferably from 1.3 to 1.7%.

The heat-absorbing glass plate according to the present embodiment may contain SrO. SrO is a component to accelerate melting of the glass raw material.

The SrO content is, as represented by mass % based on oxides, preferably from 0 to 5%. When the SrO content is at most 5%, it is possible to sufficiently accelerate melting of the glass raw material. The SrO content is, as represented by mass % based on oxides, more preferably from 0 to 3%.

The heat-absorbing glass plate according to the present embodiment may contain BaO. BaO is a component to accelerate melting of the glass raw material.

The BaO content is, as represented by mass % based on oxides, preferably from 0 to 5%. When the BaO content is at most 5%, it is possible to sufficiently accelerate melting of the glass raw material. The BaO content is, as represented by mass % based on oxides, more preferably from 0 to 3%.

The heat-absorbing glass plate according to the present embodiment may contain $TiO_2$. $TiO_2$ is a component to lower the ultraviolet transmittance and is a green or yellow coloring component.

When the $TiO_2$ content as represented by mass % based on oxides is more than 0%, the ultraviolet transmittance will be lowered, and it is possible to obtain a glass plate which provides a green or yellow transmitted light. The $TiO_2$ content is, as represented by mass % based on oxides, more preferably at least 0.1%, further preferably at least 0.3%, particularly preferably at least 0.5%. When the $TiO_2$ content as represented by mass % based on oxides is at most 3%, Tv can be increased. The $TiO_2$ content is, as represented by mass % based on oxides, more preferably at most 2%, further preferably at most 1%.

The heat-absorbing glass plate according to the present embodiment may contain substantially no $TiO_2$, when a glass plate which provides a blue or green transmitted light is to be obtained.

The heat-absorbing glass plate according to the present embodiment may contain $CeO_2$. $CeO_2$ is a component to lower the ultraviolet transmittance.

When the $CeO_2$ content as represented by mass % based on oxides is more than 0%, the ultraviolet transmittance can be lowered. The $CeO_2$ content is, as represented by mass % based on oxides, more preferably at least 0.1%, further preferably at least 0.3%, particularly preferably at least 0.5%. When the $CeO_2$ content as represented by mass % based on oxides is at most 3%, Tv can be increased, and the cost can be kept low. The $CeO_2$ content is, as represented by mass % based on oxides, more preferably at most 2%, further preferably at most 1%, particularly preferably less than 0.8%, most preferably less than 0.6%.

The heat-absorbing glass plate according to the present embodiment may contain substantially no $CeO_2$, with a view to keeping the cost low.

The heat-absorbing glass plate according to the present embodiment may contain $ZrO_2$ up to 1% as the case requires. $ZrO_2$ is a component to improve the coefficient of elasticity of glass. The $ZrO_2$ content is preferably at most 0.5%, more preferably at most 0.1%, and it is further preferred that substantially no $ZrO_2$ is contained.

The heat-absorbing glass plate according to the present embodiment preferably contains substantially no other coloring components (such as $V_2O_5$, CuO, $Cr_2O_3$, NiO and MnO). If they are contained, Tv decreases, and Tv/Te decreases.

The heat-absorbing glass plate according to the present embodiment may contain $Sb_2O_3$ and $As_2O_3$ used as other refining agents in a total content up to 0.3% as the case requires. Their total content is preferably at most 0.2, more preferably at most 0.1%. However, it is preferred that substantially no such components are contained considering the environmental burden.

The specific gravity of the heat-absorbing glass plate according to the present embodiment is preferably from 2.48 to 2.55, more preferably from 2.50 to 2.53. When the specific gravity of the heat-absorbing glass plate according to the present embodiment is adjusted to be equal to that of conventional soda lime silica glass, the efficiency for the change of the composition (i.e. the change of the glass base) at the time of production can be improved.

The specific gravity of the heat-absorbing glass plate according to the present embodiment can be adjusted by adjusting the glass composition. In order to obtain the above specific gravity, the mass ratio of $SiO_2/(MgP+CaO)$ is adjusted to be preferably from 6.0 to 9.0, more preferably from 6.7 to 8.7. Further, also in a case where SrO and/or BaO is contained, the mass ratio of $SiO_2/(MgP+CaO+SrO+BaO)$ is likewise adjusted to be preferably from 6.0 to 9.0, more preferably from 6.7 to 8.7.

Tv/Te of the heat-absorbing glass plate according to the present embodiment is at least 1.5 calculated as 4 mm thickness of the glass plate. When Tv/Te is at least 1.5, the solar transmittance is sufficiently lower than the visible light transmittance. Tv/Te calculated as 4 mm thickness of the glass plate is preferably at least 1.55, more preferably at least 1.60, further preferably at least 1.65.

Tv of the heat-absorbing glass plate according to the present embodiment is at most 65% calculated as 4 mm thickness of the glass plate. When Tv is at most 65%, a low visible light transmittance required for a heat-absorbing glass plate which provides a dark gray transmitted light is sufficiently satisfied. Tv calculated as 4 mm thickness of the glass plate is preferably at most 60%, more preferably at most 55%. Tv calculated as 4 mm thickness of the glass plate is preferably at least 45%, more preferably at least 50% in order that Tv/Te of at least 1.5 is readily be achieved and in view of visibility through the glass plate.

Te of the heat-absorbing glass plate according to the present embodiment is preferably at most 50% calculated as 4 mm in thickness of the glass plate. When Te is at most 50%, a low solar transmittance required for a heat-absorbing glass plate is sufficiently satisfied. Te calculated as 4 mm thickness of the glass plate is more preferably at most 45%, further preferably at most 40%, particularly preferably at most 35%.

The transmittance at a wavelength of 1,500 nm of the heat-absorbing glass plate of the present invention is preferably at most 30% calculated as 4 mm thickness of the glass plate. When the transmittance at a wavelength of 1,500 nm is at most 30%, a low solar transmittance required for a heat-absorbing glass plate is sufficiently satisfied. Further, it is possible to reduce discomfort (scorching feeling) caused by an increase of the skin temperature by application of solar radiation to the skin. The transmittance at a wavelength of 1,500 nm calculated as 4 mm thickness of the glass plate is more preferably at most 27%, further preferably at most 25%, particularly preferably at most 22%, most preferably at most 20%.

The dominant wavelength Dw of the transmitted light through the heat-absorbing glass plate according to the present embodiment (hereinafter sometimes referred to as Dw) calculated as 4 mm thickness of the glass plate is at most 560 nm, preferably at most 510 nm, more preferably at most 503 nm. When Dw is at most 560 nm, preferably at most 510 nm, further preferably at most 503 nm, it is possible to obtain a glass plate which provides a blue or green transmitted light. Dw calculated as 4 mm thickness of the glass plate is more preferably from 487 to 500 nm, further preferably from 488 to 497 nm, particularly preferably from 490 to 495 nm.

β-OH of the heat-absorbing glass plate according to the present embodiment is preferably at least $0.15\ mm^{-1}$. β-OH is an index showing the water content. When β-OH is at least $0.15\ mm^{-1}$, the refining ability can be improved, and the $SO_3$ content can be reduced. Further, the temperature in the bending step can be decreased. β-OH is preferably from 0.15 to $0.45\ mm^{-1}$, more preferably from 0.20 to $0.35\ mm^{-1}$, further preferably from 0.23 to $0.30\ mrn^{-1}$, particularly preferably from 0.25 to $0.28\ mm^{-1}$. β-OH is a value obtained by the following formula.

$$\beta\text{-OH }(mm^{-1}) = -\log_{10}(T_{3500\ cm-1}/T_{4000\ cm-1})/t$$

In the above formula, $T_{3500\ cm-1}$ is a transmittance (%) at a wave number of $3,500\ cm^{-1}$, $T_{4000\ cm-1}$ is a transmittance (%) at a wave number of $4,000\ cm^{-1}$, and t is the thickness (mm) of the glass plate.

The heat-absorbing glass plate according to the present embodiment can be used either for vehicles and for building, and is particularly suitable as glass for building. When it is used as window glass for an automobile, as the case requires, it is formed into laminated glass having an interlayer sandwiched between a plurality of glass plates, glass having flat glass processed to have a curved surface, or tempered glass. Further, when it is used as double glazing for building, it is used as double glazing comprising two sheets of the heat-absorbing glass plates of the present invention or as double glazing of the heat-absorbing glass plate of the present invention and another glass plate.

The heat-absorbing glass plate according to the present embodiment is produced, for example, by means of the following steps (i) to (v) in order.

(i) A glass matrix material such as silica sand, coloring component materials such as an iron source, a selenium source and a cobalt source, a reducing agent, a refining agent and the like are mixed to achieve the desired glass composition to prepare a glass raw material.

(ii) The glass raw material is continuously supplied to a melting furnace, heated to a temperature of from about 1,400° C. to 1,550° C. (e.g. about 1,500° C.) by burning heavy oil, natural gas or the like, and melted to form molten glass.

(iii) The molten glass is refined and then formed into a glass plate having a predetermined thickness by a glass plate-forming method such as a float process.

(iv) The glass plate is annealed and cut into a predetermined size to obtain a heat-absorbing glass plate of the present invention.

(v) As the case requires, the cut glass plate may be tempered, may be formed into laminated glass, or may be formed into double glazing.

The glass matrix material may be one used as a material of conventional soda lime silica glass, such as silica sand, soda ash, lime stone or feldspar.

The iron source may, for example, be iron powder, iron oxide powder or red iron oxide.

The selenium source may, for example, be sodium selenite.

The cobalt source may, for example, be cobalt oxide.

The tin source may, for example, be tin oxide.

The reducing agent may, for example, be carbon or coke. The reducing agent is to suppress oxidation of iron in the molten glass and to adjust Fe-redox to a desired level.

In addition, salt cake ($Na_2SO_4$) as a refining agent is used.

The above-described heat-absorbing glass plate according to the present embodiment, which contains selenium and cobalt, has a low visible light transmittance and a low excitation purity. Specifically, it has Tv of at most 65% calculated as 4 mm thickness of the glass plate and Pe of at most 7% calculated 4 mm thickness of the glass plate.

Further, since it contains tin, amber coloring due to reduction of sulfur can be suppressed even when Fe-redox is at least 55%, and the visible light transmittance is not decreased more than necessary, and as a result, the solar transmittance is sufficiently lower than the visible light transmittance. Specifically, Tv/Te calculated as 4 mm thickness of the glass plate is at least 1.5.

EXAMPLES

Now, the present invention will be described in further detail with reference to Examples. However, it should be understood that the present invention is by no means restricted to such specific Examples.

Ex. 1 to 17 are Examples of the present invention, and Ex. 18 to 26 are Comparative Examples.

(Fe-Redox)

With respect to the obtained glass plate, Fe-Redox was calculated from a spectral curve of glass measured by a spectrophotometer.

(Tv)

With respect to the obtained glass plate, the visible light transmittance Tv (a value under measuring conditions of illuminant A and 2° visual field) as defined in JIS R3106 (1998) was obtained as a value calculated as 4 mm thickness.

(Te)

With respect to the obtained glass plate, the solar transmittance Te as defined in JIS R3106 (1998) was obtained as a value calculated as 4 mm thickness.

(Dw)

With respect to the obtained glass plate, the dominant wavelength Dw of the transmitted light as defined in JIS Z8701 (1999) was obtained as a value calculated as 4 mm thickness.

(Pe)

With respect to the obtained glass plate, the excitation purity Pe as defined in JIS Z8701 (1999) was obtained as a value calculated as 4 mm thickness.

(β-OH)

With respect to the obtained glass plate, β-OH was calculated in accordance with the following formula from an infrared absorption spectral curve of glass measured by FT-IR.

$$\beta\text{-OH (mm}^{-1}) = -\log_{10}(T_{3500\ cm\text{-}1}/T_{4000\ cm\text{-}1})/t$$

In the above formula, $T_{3500\ cm\text{-}1}$ is the transmittance (%) at a wave number of 3,500 $cm^{-1}$, $T_{4000\ cm\text{-}1}$ is the transmittance (%) at a wave number of 4,000 $cm^{-1}$, and t is the thickness (mm) of the glass plate.

Ex. 1 to 17

Glass matrix materials such as silica sand, coke, coloring component materials such as an iron source, $SnO_2$ and salt cake ($Na_2SO_4$) were mixed to achieve compositions as identified in Tables 1, 2 and 3 to prepare glass raw materials. Each glass raw material was put into a crucible and heated at 1,500° C. for 2 hours to form molten glass. The molten glass was cast on a carbon plate and cooled. Both surfaces of the obtained plate-form glass were polished to obtain a glass plate having a thickness of 4 mm. With respect to the glass plate, the transmittance was measured every 1 nm by using a spectrophotometer (manufactured by PerkinElmer Co., Ltd., Lambda 950) to determine Te, Tv, Dw and Pe. Further, the above glass was polished to a thickness of 2 mm, and with respect to this glass plate, the transmittance was measured every 1 $cm^{-1}$ by FT-IR (manufactured by Thermo Nicolet Corporation, Thermo Nicolet Avatar 370), and β-OH was obtained based on the above formula. The results are shown in Tables 1, 2 and 3.

Numerical values in brackets for β-OH in Tables 1 to 3 are calculated values.

Ex. 18 to 26

Ex. 18 to 19 are cited from Examples disclosed in Patent Document 2, Ex. 20 to 22 are cited from Examples in Patent Document 3, and Ex. 23 to 26 are cited from Examples disclosed in Patent Document 1. Cited values are shown in Tables 4 and 5. In Ex. 18 to 26, LTA and TSET were employed as indices to the visible light transmittance and the solar transmittance, respectively, and LTA and TSET were regarded as being equal to Tv and Te, respectively.

In "composition" in Tables 1 to 5, $Fe_2O_3$ indicates the amount of total iron, $SnO_2$ indicates the amount of total tin, and $SO_3$ indicates the amount of total sulfur.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Composition (%) | $SiO_2$ | 70.5 | 71.0 | 71.0 | 71.1 | 71.1 | 71.8 | 70.7 |
|  | $Al_2O_3$ | 3.2 | 3.3 | 3.3 | 3.3 | 3.3 | 3.4 | 3.3 |
|  | MgO | 0.1 | 0.1 | 0.1 | 0.1 | 0.1 | 0.1 | 0.1 |
|  | CaO | 9.4 | 9.1 | 8.9 | 8.9 | 8.8 | 8.3 | 9.2 |
|  | $Na_2O$ | 14.6 | 14.5 | 14.6 | 14.5 | 14.5 | 14.4 | 14.6 |
|  | $K_2O$ | 1.5 | 1.5 | 1.5 | 1.5 | 1.5 | 1.5 | 1.5 |
|  | $Fe_2O_3$ | 0.39 | 0.40 | 0.40 | 0.40 | 0.38 | 0.38 | 0.39 |
|  | $TiO_2$ |  |  |  |  |  |  |  |
|  | $CeO_2$ |  |  |  |  |  |  |  |
|  | Se | 0.0009 | 0.0010 | 0.0010 | 0.0010 | 0.0008 | 0.0007 | 0.0009 |
|  | CoO | 0.0025 | 0.0030 | 0.0031 | 0.0031 | 0.0011 | 0.0123 | 0.0021 |
|  | $Cr_2O_3$ |  |  |  |  |  |  |  |
|  | MnO |  |  |  |  |  |  |  |
|  | ZnO |  |  |  |  |  |  |  |
|  | NiO |  |  |  |  |  |  |  |
|  | $SnO_2$ | 0.20 | 0.20 | 0.21 | 0.20 | 0.21 | 0.21 | 0.21 |
|  | $SO_3$ | 0.020 | 0.009 | 0.002 | 0.001 | 0.001 | 0.001 | 0.002 |
| Fe-redox (%) |  | 64 | 62 | 64 | 61 | 67 | 55 | 56 |
| $SnO_2/SO_3$ |  | 9.95 | 22.22 | 103.00 | 202.00 | 205.00 | 207.00 | 104.00 |
| $(SnO_2/SO_3)$/Fe-redox |  | 0.16 | 0.36 | 1.62 | 3.29 | 3.04 | 3.78 | 1.86 |
| β-OH ($mm^{-1}$) |  | (0.265) | (0.265) | (0.265) | (0.265) | (0.265) | (0.265) | (0.265) |
| Tv (%) |  | 56.1 | 56.6 | 56.6 | 55.8 | 63.9 | 64.6 | 61.8 |
| Te (%) |  | 30.6 | 35.3 | 34.8 | 35.0 | 37.6 | 40.4 | 39.2 |
| Dw (nm) |  | 555.0 | 489 | 488 | 490 | 496 | 503 | 492 |
| Pe (%) |  | 6.2 | 3.7 | 4.3 | 3.2 | 2.5 | 1.5 | 2.8 |
| Tv/Te |  | 1.83 | 1.60 | 1.62 | 1.60 | 1.70 | 1.60 | 1.58 |
| T(1500 nm) (%) |  | 18.9 | 20.7 | 19.8 | 21.1 | 20.3 | 26.5 | 25.3 |

TABLE 2

|  |  | Ex. 8 | Ex. 9 | Ex. 10 | Ex. 11 | Ex. 12 |
|---|---|---|---|---|---|---|
| Composition (%) | $SiO_2$ | 70.3 | 71.1 | 71.4 | 70.9 | 70.7 |
|  | $Al_2O_3$ | 3.3 | 3.4 | 3.4 | 3.3 | 3.3 |
|  | MgO | 0.1 | 0.1 | 0.1 | 0.1 | 0.1 |
|  | CaO | 9.6 | 8.9 | 8.6 | 9.0 | 9.4 |
|  | $Na_2O$ | 14.7 | 14.4 | 14.5 | 14.6 | 14.5 |
|  | $K_2O$ | 1.5 | 1.5 | 1.5 | 1.5 | 1.5 |
|  | $Fe_2O_3$ | 0.37 | 0.38 | 0.39 | 0.40 | 0.35 |
|  | $TiO_2$ |  |  |  |  |  |
|  | $CeO_2$ |  |  |  |  |  |
|  | Se | 0.0008 | 0.0010 | 0.0008 | 0.0010 | 0.0011 |
|  | CoO | 0.0015 | 0.0027 | 0.0028 | 0.0042 | 0.0015 |
|  | $Cr_2O_3$ |  |  |  |  |  |
|  | MnO |  |  |  |  |  |
|  | ZnO |  |  |  |  |  |
|  | NiO |  |  |  |  |  |
|  | $SnO_2$ | 0.19 | 0.20 | 0.21 | 0.21 | 0.19 |
|  | $SO_3$ | 0.008 | 0.004 | 0.008 | 0.008 | 0.022 |
| Fe-redox (%) |  | 66 | 59 | 74 | 66 | 76 |
| $SnO_2/SO_3$ |  | 24.00 | 49.50 | 26.00 | 25.88 | 8.68 |
| $(SnO_2/SO_3)$/Fe-redox |  | 0.36 | 0.84 | 0.35 | 0.39 | 0.11 |
| β-OH ($mm^{-1}$) |  | (0.265) | (0.265) | (0.265) | (0.265) | (0.265) |
| Tv (%) |  | 63.3 | 58.2 | 49.4 | 51.6 | 60.0 |
| Te (%) |  | 38.0 | 36.9 | 29.6 | 32.3 | 34.1 |
| Dw (nm) |  | 496 | 492 | 487 | 487 | 559 |
| Pe (%) |  | 2.4 | 2.6 | 6.1 | 4.5 | 5.8 |
| Tv/Te |  | 1.66 | 1.58 | 1.67 | 1.60 | 1.76 |
| T(1500 nm) (%) |  | 21.6 | 24.2 | 15.5 | 18.7 | 18.9 |

TABLE 3

|  |  | Ex. 13 | Ex. 14 | Ex. 15 | Ex. 16 | Ex. 17 |
|---|---|---|---|---|---|---|
| Composition (%) | $SiO_2$ | 70.5 | 71.2 | 70.8 | 70.6 | 70.6 |
|  | $Al_2O_3$ | 3.3 | 3.3 | 3.3 | 3.3 | 3.3 |
|  | MgO | 0.1 | 0.1 | 0.1 | 0.1 | 0.1 |
|  | CaO | 9.3 | 9.0 | 9.2 | 9.5 | 9.5 |
|  | $Na_2O$ | 14.7 | 14.3 | 14.2 | 14.3 | 14.2 |
|  | $K_2O$ | 1.5 | 1.5 | 1.5 | 1.5 | 1.5 |
|  | $Fe_2O_3$ | 0.40 | 0.36 | 0.39 | 0.37 | 0.39 |
|  | $TiO_2$ |  |  | 0.02 | 0.02 | 0.01 |
|  | $CeO_2$ |  |  | 0.03 | 0.01 | 0.03 |
|  | Se | 0.0010 | 0.0007 | 0.0011 | 0.0009 | 0.0012 |
|  | CoO | 0.0024 | 0.0005 | 0.0039 | 0.0019 | 0.0036 |
|  | $Cr_2O_3$ |  |  |  |  |  |
|  | MnO |  |  |  |  |  |
|  | ZnO |  |  |  |  |  |
|  | NiO |  |  |  |  |  |
|  | $SnO_2$ | 0.21 | 0.21 | 0.21 | 0.21 | 0.21 |
|  | $SO_3$ | 0.016 | 0.002 | 0.018 | 0.018 | 0.018 |
| Fe-redox (%) |  | 55 | 70 | 66 | 63 | 60 |
| $SnO_2/SO_3$ |  | 12.81 | 104.00 | 11.67 | 8.79 | 11.67 |
| $(SnO_2/SO_3)$/Fe-redox |  | 0.23 | 1.49 | 0.18 | 0.14 | 0.20 |
| β-OH ($mm^{-1}$) |  | (0.265) | (0.265) | 0.276 | 0.275 | 0.271 |
| Tv (%) |  | 57.5 | 57.0 | 54.6 | 61.7 | 54.3 |
| Te (%) |  | 34.5 | 33.9 | 34.0 | 37.8 | 35.2 |
| Dw (nm) |  | 492 | 498 | 488 | 495 | 497 |
| Pe (%) |  | 3.2 | 2.1 | 4.3 | 2.4 | 1.3 |
| Tv/Te |  | 1.67 | 1.68 | 1.60 | 1.63 | 1.54 |
| T(1500 nm) (%) |  | 20.8 | 19.4 | 19.3 | 21.8 | 22.2 |

TABLE 4

|  |  | Ex. 18 | Ex. 19 | Ex. 20 | Ex. 21 | Ex. 22 |
|---|---|---|---|---|---|---|
| Composition (%) | $SiO_2$ | 73.3 to 73.9 |  | 72.1 | 72.1 | 72.1 |
|  | $Al_2O_3$ | 0.12 to 0.16 |  | 0.2 | 0.2 | 0.2 |
|  | MgO | 3.6 to 3.8 |  | 3.8 | 3.8 | 3.8 |
|  | CaO | 8.5 to 8.8 |  | 8.8 | 8.8 | 8.8 |
|  | $Na_2O$ | 13.2 to 13.6 |  | 13.6 | 13.6 | 13.6 |
|  | $K_2O$ | 0.031 to 0.034 |  | 0.1 | 0.1 | 0.1 |
|  | $Fe_2O_3$ | 0.629 | 0.75 | 0.265 | 0.366 | 0.375 |
|  | $TiO_2$ |  |  |  | 0.021 |  |
|  | $CeO_2$ |  |  |  |  |  |
|  | Se |  |  | 0.0004 | 0.0005 | 0.0005 |
|  | CoO | 0.0006 | 0.0005 | 0.0005 |  |  |
|  | $Cr_2O_3$ |  | 0.0007 | 0.0008 | 0.0006 | 0.0008 |

TABLE 4-continued

|  | Ex. 18 | Ex. 19 | Ex. 20 | Ex. 21 | Ex. 22 |
|---|---|---|---|---|---|
| MnO |  |  | 0.0019 | 0.0021 |  |
| ZnO |  |  | 0.021 |  | 0.03 |
| NiO |  |  |  |  |  |
| $SnO_2$ |  |  |  |  |  |
| $SO_3$ |  |  | 0.051 | 0.079 | 0.024 |
| Fe-redox (%) | 36.9 | 36.0 | 67.5 | 50.3 | 50.9 |
| $SnO_2/SO_3$ | — | — | — | — | — |
| $(SnO_2/SO_3)$/Fe-redox | — | — | — | — | — |
| β-OH $(mm^{-1})$ | — | — | — | — | — |
| LTA (%) 3.9 mmt | 72.3 | 70.6 | 71.99 | 71.87 | 71.73 |
| TSET (%) 3.9 mmt | 45 | 42.6 | 49.85 | 49.37 | 48.48 |
| Dw (nm) | 488.6 | 489.8 | 527.46 | 529.77 | 529.72 |
| Pe (%) | 7.79 | 7.43 | 1.6 | 1.26 | 1.31 |
| LTA/TSET | 1.61 | 1.66 | 1.44 | 1.46 | 1.48 |
| T(1500 nm) (%) | — | — | — | — | — |

TABLE 5

|  |  | Ex. 23 | Ex. 24 | Ex. 25 | Ex. 26 |
|---|---|---|---|---|---|
| Composition (%) | $SiO_2$ | 72.5 | 72.5 | 72.5 | 72.5 |
|  | $Al_2O_3$ | 0.13 | 0.13 | 0.13 | 0.13 |
|  | MgO | 3.8 | 3.8 | 3.8 | 3.8 |
|  | CaO | 8.8 | 8.8 | 8.8 | 8.8 |
|  | $Na_2O$ | 13.8 | 13.8 | 13.8 | 13.8 |
|  | $K_2O$ |  |  |  |  |
|  | $Fe_2O_3$ | 0.65 | 0.6 | 0.17 | 0.17 |
|  | $TiO_2$ |  |  |  |  |
|  | $CeO_2$ |  |  |  |  |
|  | Se | 0.00035 | 0.00025 |  |  |
|  | CoO | 0.002 | 0.0015 | 0.0052 | 0.004 |
|  | $Cr_2O_3$ |  |  |  |  |
|  | MnO |  |  |  |  |
|  | ZnO |  |  |  |  |
|  | NiO |  |  | 0.03 | 0.03 |
|  | $SnO_2$ |  |  |  |  |
|  | $SO_3$ |  |  |  |  |
| Fe-redox (%) |  | 30 | 29.2 | 25.5 | 25.5 |
| $SnO_2/SO_3$ |  | — | — | — | — |
| $(SnO_2/SO_3)$/Fe-redox |  | — | — | — | — |
| β-OH $(mm^{-1})$ |  | — | — | — | — |
| LTA (%) 3.9 mmt |  | 66.61 | 70.1 | 59.95 | 62.64 |
| TSET (%) 3.9 mmt |  | 45.87 | 49.3 | 65.62 | 66.56 |
| Dw (nm) |  | 493.5 | 494.9 | 511.2 | 558.3 |
| Pe (%) |  | 3.7 | 3.2 | 0.88 | 2.42 |
| LTA/TSET |  | 1.45 | 1.42 | 0.91 | 0.94 |
| T (1500 nm) (%) |  | — | — | — | — |

The heat-absorbing glass plates in Ex. 1 to 17 contain iron, tin, selenium, cobalt and sulfur and have Fe-redox of at least 55%, and accordingly they have a low visible transmittance, a solar transmittance sufficiently lower than the visible light transmittance, and a low excitation purity.

The heat-absorbing glass plates in Ex. 18 to 19 contain no Se and have a low CoO content, and accordingly they have high Tv. Further, they contain no Se, have a low CoO content and have a high content of $Fe_2O_3$, and accordingly they have high Pe.

The heat-absorbing glass plates in Ex. 20 to 22 have low contents of $t-Fe_2O_3$, Se and CoO, and accordingly they have high Tv. Further, they have high Fe-redox but contain no $SnO_2$, and accordingly they have low Tv/Te due to amber coloring.

The heat-absorbing glass plates in Ex. 23 to 24 have low contents of Se and CoO, and accordingly they have high Tv. Further, they have a high $t-Fe_2O_3$ content and have low Fe-redox, and accordingly their Tv is low more than necessary rather than Te and resultingly they have low Tv/Te.

The heat-absorbing glass plates in Ex. 25 to 26 contain no Se and contain NiO to keep Pe low. Accordingly, they have low Tv and resultingly low Tv/Te.

INDUSTRIAL APPLICABILITY

The heat-absorbing glass plate of the present invention is characterized in that the solar transmittance is sufficiently lower than the visible light transmittance, and accordingly it is useful as a glass plate for vehicles and for building, and is particularly suitable as a glass plate for building.

This application is a continuation of PCT Application No. PCT/JP2015/063369 filed on May 8, 2015, which is based upon and claims the benefit of priority from Japanese Patent Application No. 2014-098129 filed on May 9, 2014. The contents of those applications are incorporated herein by reference in their entireties.

What is claimed is:

1. A heat-absorbing glass plate comprising iron, tin, selenium, cobalt and sulfur, wherein
   the mass ratio of divalent iron as calculated as $Fe_2O_3$ to total iron as calculated as $Fe_2O_3$ is at least 55%,
   the content of Se as represented by mass % based on Se is from 0.0003 to 0.0020%,
   the content of total cobalt as calculated as CoO is, as represented by mass % based on oxides, from 0.0010 to 0.0060%.
   the content of total tin as calculated as $SnO_2$ is, as represented by mass % based on oxides, from 0.02 to 0.3%,
   the ratio Tv/Te of the visible light transmittance Tv (by illuminant A, 2° visual field) as defined in JIS R3106 (1998) calculated as 4 mm thickness of the glass plate to the solar transmittance Te as defined in JIS R3106 (1998) calculated as 4 mm thickness of the glass plate, is at least 1.5,
   the visible light transmittance Tv (by illuminant A, 2° visual field) is at most 65% as defined in JIS R3106 (1998) calculated as 4 mm thickness of the glass plate, and
   the excitation purity Pe is at most 7% as defined in JIS Z8701 (1999) calculated as 4mm thickness of the glass plate.

2. The heat-absorbing glass plate according to claim 1, wherein the mass ratio $(SnO_2/SO_3)$ of the content of total tin as calculated as $SnO_2$ to the content of total sulfur as calculated as $SO_3$ is from 0.2 to 210.

3. The heat-absorbing glass plate according to claim 1, wherein the content of total tin as calculated as $SnO_2$ is, as represented by mass % based on oxides, at least 0.05%.

4. The heat-absorbing glass plate according to claim 1, wherein the content of total tin as calculated as $SnO_2$ is, as represented by mass % based on oxides, at least 0.09%.

5. The heat-absorbing glass plate according to claim 1, wherein the content of total sulfur as calculated as $SO_3$ as represented by mass % based on oxides is from 0.001 to 0.1%.

6. The heat-absorbing glass plate according to claim 1, wherein the content of total sulfur as calculated as $SO_3$ as represented by mass % based on oxides is at least 0.005% and less than 0.02%.

7. The heat-absorbing glass plate according to claim 1, wherein the content of total iron as calculate as $Fe_2O_3$ as represented by mass % based on oxides is from 0.01 to 1.0%.

8. The heat-absorbing glass plate according to claim 1, wherein the MgO content as represented by mass % based on oxides is at most 3.0%.

9. The heat-absorbing glass plate according to claim 1, which comprises soda lime silica glass comprising, as represented by mass % based on the following components:

$SiO_2$: 65 to 75%,
$Al_2O_3$: more than 3% and at most 6%,
MgO: 0% to less than 2%,
CaO: 7 to 10%,
$Na_2O$: 5 to 18%,
$K_2O$: 0 to 5%,
total iron as calculated as $Fe_2O_3$: 0.3 to 0.9%,
total tin as calculated as $SnO_2$: 0.02 to 0.3%
Se: 0.0003 to 0.0020%
CoO: 0.0010 to 0.0060% and
total sulfur as calculated as $SO_3$: 0.001 to 0.1%.

10. The heat-absorbing glass plate according to claim 1, wherein the transmittance at a wavelength of 1,500 nm is at most 30% calculated as 4 mm thickness of the glass plate.

11. The heat-absorbing glass plate according to claim 1, which provides a transmitted light having a dominant wavelength Dw of at most 560 nm as defined in JIS Z8701 (1999) calculated as 4 mm thickness of the glass plate.

12. The heat-absorbing glass plate according to claim 1, wherein the solar transmittance Te is at most 50% as defined in JIS R3106 (1998) calculated as 4 mm thickness of the glass plate.

13. The heat-absorbing glass plate according to claim 1, wherein β-OH is at least 0.15 $mm^{-1}$.

14. A process for producing a heat-absorbing glass plate, which comprises melting a glass raw material, followed by forming to produce soda lime silica glass, wherein the glass after the forming is the heat-absorbing glass plate as defined in claim 1.

\* \* \* \* \*